United States Patent
Yamaguchi et al.

(10) Patent No.: US 6,710,106 B2
(45) Date of Patent: Mar. 23, 2004

(54) MOLDING COMPOSITION

(75) Inventors: Takashi Yamaguchi, Wakayama (JP); Katsutoshi Aoki, Wakayama (JP); Kuniyasu Kawabe, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/773,752

(22) Filed: Feb. 2, 2001

(65) Prior Publication Data

US 2001/0016614 A1 Aug. 23, 2001

(30) Foreign Application Priority Data

Feb. 3, 2000  (JP) ..................... P. 2000-26825

(51) Int. Cl.⁷ .......................... C08L 67/06; C08F 20/34; C08J 5/18
(52) U.S. Cl. .................. 523/513; 523/500; 525/430; 525/449
(58) Field of Search ................ 523/513, 500; 525/430, 449

(56) References Cited

U.S. PATENT DOCUMENTS

| | | | | |
|---|---|---|---|---|
| 4,524,178 A | * | 6/1985 | Hefner, Jr. et al. | |
| 5,077,326 A | * | 12/1991 | Shibata et al. | |
| 5,356,953 A | * | 10/1994 | Harada et al. | |
| 5,741,448 A | * | 4/1998 | Wiseman | |
| 6,300,387 B2 | * | 10/2001 | Yamaguchi et al. | |

FOREIGN PATENT DOCUMENTS

| | | | |
|---|---|---|---|
| JP | 5755962 | | 4/1982 |
| JP | 58103519 | | 6/1983 |
| JP | 63-305160 | * | 12/1988 |
| JP | 2-31090 | | 7/1990 |
| JP | 04-21579 | * | 1/1992 |
| JP | 5169475 | | 7/1993 |
| JP | A-6-9796 | | 1/1995 |
| JP | 7-1666 | | 1/1995 |

* cited by examiner

Primary Examiner—Tae H. Yoon
(74) Attorney, Agent, or Firm—Birch, Stewart, Kolasch & Birch, LLP

(57) ABSTRACT

A molding composition comprising an aggregate [Component (A)], a linear unsaturated polyester [Component (B)] and/or linear unsaturated polyester polyamide [Component (C)], and a radical generator [Component (D)], characterized in that each of Component (B) and Component (C) comprises a specific alkylene oxide adduct of bisphenol A in an amount of from 3 to 50 mol % based on the total amount of constituent monomers of each of Component (B) and Component (C) and a molded article obtained by molding the composition.

8 Claims, No Drawings

MOLDING COMPOSITION

FIELD OF THE INVENTION

The present invention relates to a molding composition suitable for production of cores of automobile interior materials, sound absorbers of air conditioners, glass mat, constructional sound insulators, and the like.

BACKGROUND OF THE INVENTION

Cores of automobile interior materials, sound absorbers of air conditioners, glass mat, constructional sound insulators, and the like are produced from molding compounds mainly comprising fiber, a phenolic resin, and an amine-based curing agent to secure sufficient strength (see, for example, JP-A-57-55962 (The term "JP-A" as used herein means an "unexamined published Japanese patent application") and JP-A-7-1666). However, phenolic resins react or decompose to produce formaldehyde, and amine-based curing agents have the problem of smell.

Powdered molding compositions comprising a diallyl phthalate prepolymer and/or a crystalline unsaturated polyester resin, fiber, and a curing agent are known (see JP-A-5-169475). However, the diallyl phthalate prepolymer has a low iodine value and fails to achieve a high crosslinking density, resulting in the production of a molded article having insufficient strength.

A molding composition comprising a non-crystalline unsaturated polyester and an ethylenically unsaturated group-containing monomer having compatibility with the unsaturated polyester and a molding composition further comprising a polymerization initiator are also known (see JP-B-2-31090 (The term "JP-B" as used herein means an "examined Japanese patent application")). Although any ethylenically unsaturated group-containing monomer such as styrene compatible with an unsaturated polyester acts as a crosslinking agent to provide a molded article with improved strength, it has the problems of smell and safety.

SUMMARY OF THE INVENTION

An object of the present invention is to provide a molding composition suitable for production of a molded article having practically sufficient strength and heat resistance and improved safety and smell and such a molded article.

The present invention relates
(1) a molding composition comprising an aggregate [Component (A)], a linear unsaturated polyester [Component (B)] and/or a linear unsaturated polyester polyamide [Component (C)], and a radical generator [Component (D)], wherein Components (B) and (C) comprise an alkylene (having from 2 to 4 carbon atoms) oxide adduct of bisphenol A (average added number of mols: 1 to 10) in an amount of from 3 to 50 mol % based on the total amount of constituent monomers and
(2) a molded article obtained by molding the molding composition defined in item (1) above.

DETAILED DESCRIPTION OF THE INVENTION

In the present invention, the use of a linear unsaturated polyester [Component (B)] and/or linear unsaturated polyester polyamide [Component (C)] comprising an alkylene (having from 2 to 4 carbon atoms) oxide adduct of bisphenol A (average added number of mols: 1 to 10) in an amount of from 3 to 50 mol % based on the total amount of constituent monomers and preferably having an iodine value of from 70 to 150 makes it possible to obtain a molded article having practically sufficient strength and heat resistance and improved safety and smell.

As the aggregate to be used as Component (A) there may be used fibrous substrate or wood. The fibrous substrate is not specifically limited. As the fibrous substrate there may be used inorganic fiber such as glass fiber or organic fiber such as synthetic fiber and natural fiber. In particular, cotton, flax, wool, silk, wood fiber, nylon, etc. are preferred from the standpoint of flexibility and heat insulation of a molded article. Alternatively, inorganic fiber and organic fiber may be used in admixture. Component (A) can be used in the form of yarn or fabric, either woven or nonwoven.

The linear unsaturated polyester to be used as Component (B) comprises an alkylene (having from 2 to 4 carbon atoms) oxide adduct of bisphenol A (average added number of mols: 1 to 10 (The term "average added number of mols" as used herein is meant to indicate average added number of mols per molecule)) in an amount of from 3 to 50 mol % based on the total amount of constituent monomers of Component (B) and preferably has an iodine value of from 70 to 150 from the standpoint of molding properties in high temperatures and strength of molded articles Examples of such an alkylene oxide include ethylene oxide, propylene oxide, and butylene oxide. Preferred among these alkylene oxides are ethylene oxide and propylene oxide. Two or more alkylene oxides may be added. A bisphenol A having ethylene oxide and propylene oxide added thereto is preferred. The average added number of mols of alkylene oxide is preferably from 2 to 5. The content of alkylene oxide adduct of a bisphenol A is preferably from 5 to 40 mol %, more preferably from 8 to 30 mol % from the standpoint of excellence in molding properties, uniformity of molded article and enhancement of strength of molded article at ordinary and high temperatures. The iodine value of Component (B) is more preferably from 75 to 140, even more preferably from 80 to 130 from the standpoint of enhancement of crosslinking density and hence strength of molded article. The iodine value is determined according to JIS K 0070. The softening point of Component (B) is preferably from 80° C. to 130° C.

Other constituent monomers of Component (B) are not specifically limited. Known divalent alcohol components, carboxylic acid components such as divalent carboxylic acid and anhydride and ester thereof, and addition-polymerizable unsaturated group-containing monomers may be used.

The content of these monomers in Component (B) is not limited so far as the foregoing alkylene oxide adduct of bisphenol A is incorporated in an amount of from 3 to 50 mol % based on the total amount of constituent monomers of Component (B).

The ratio of the divalent carboxylic acid component to the divalent alcohol component is preferably from 0.9 to 1.1 mols, particularly from 0.95 to 1.05 mols per mol.

Examples of the divalent alcohol component other than the foregoing alkylene oxide adduct of bisphenol A include ethylene glycol, propylene glycol, 1,6-hexanediol, 1,4-butanediol, bisphenol A, and hydrogenated bisphenol A. Preferred among these divalent alcohol components are ethylene glycol, 1,4-butanediol, and hydrogenated bisphenol A.

Examples of the divalent carboxylic acid component include various dicarboxylic acids, succinic acid substituted by alkyl group having from 1 to 20 carbon atoms or alkenyl group having from 2 to 20 carbon atoms, anhydride and alkyl (having from 1 to 12 carbon atoms) ester thereof, and dimer acids. Preferred among these divalent carboxylic acid components are maleic acid, fumaric acid, terephthalic acid, and succinic acid substituted by alkenyl group having from 2 to 20 carbon atom, such as octenyl succinate anhydride and dodecyl succinate anhydride.

Examples of the addition-polymerizable unsaturated group-containing monomer include fumaric acid, maleic acid, maleic anhydride, and itaconic acid. Preferred among these addition-polymerizable unsaturated group-containing monomers are fumaric acid and maleic anhydride.

The linear unsaturated polyester polyamide to be used as Component (C) comprises an alkylene oxide adduct of bisphenol A in an amount of from 3 to 50 mol % based on the total amount of constituent monomers of Component (C) and preferably has an iodine value of from 70 to 150 from the standpoint of molding properties in high temperatures and strength of molded articles. From the same standpoint of view as for Component (B), the content of the alkylene oxide adduct of bisphenol A is preferably from 5 to 40 mol %, more preferably from 8 to 30 mol %. The iodine value of Component (C) is more preferably from 75 to 140, particular preferably from 80 to 130. Component (C) can be obtained from amine-based monomers in addition to the monomers for use in the production of Component (B). Examples of the amine-based monomer include known various polyamines, aminocarboxylic acids, amino alcohols, and lactams. Specific examples of these amine-based monomers include methaxylenediamine, ethylenediamine, hexamethylenediamine, xylylenediamine, and ε-caprolactam. The softening point of Component (C) is preferably from 80° C. to 130° C.

Each of Components (B) and (C) has at least one addition-polymerizable unsaturated group in an amount of preferably 25% by weight or more, more preferably from 35 to 70% by weight, even more preferably from 36 to 50% by weight based on an amount of constituent monomers of each of Components (B) and (C) from the standpoint of strength of molded article.

One or more of each of Component (B) and Component (C) may be used in admixture.

Component (B) or Component (C) can be obtained by reacting the foregoing mixture of monomers preferably in an atmosphere of nitrogen at a temperature of from 150° C. to 250° C. for 5 to 20 hours to produce a desired linear unsaturated polyester or linear unsaturated polyester polyamide. Since Component (B) and Component (C) to be used in the invention comprise an alkylene (having from 2 to 4 carbon atoms) oxide adduct of bisphenol A (average added number of mols: 1 to 10) in a predetermined amount, the resulting resin exhibits an enhanced hardness and provides a cured molded article having an enhanced hardness as compared with polyester free of alkylene (having from 2 to 4 carbon atoms) oxide adduct of bisphenol A (average added number of mols: 1 to 10). Component (B) or Component (C) may optionally comprise a monovalent alcohol component or carboxylic acid component incorporated therein to adjust the molecular weight thereof. In order to accelerate the reaction, a commonly used esterification catalyst such as dibutyltin oxide may be properly used. Additionally, polymerization inhibitor such as hydroquinone and t-butyl catechol may be used to prevent radical polymerization at condensation polymerization.

As the radical generator to be used as Component (D) there may be used a peroxide-based radical generator, persulfate-based radical generator, azo-based radical generator or the like. Preferred among these radical generators are peroxide-based radical generator and persulfate-based radical generator. Specific preferred examples of these radical generators include benzoyl peroxide, lauroyl peroxide, di-t-butyl peroxide, dicumyl peroxide, t-butylcumyl peroxide, and sodium persulfate. The half-life period of Component (D) is preferably 7 days or longer at 40° C. taking into account the storage properties and stability of molding composition or 10 minutes or less at 250° C. from the standpoint of molding time.

The molding composition of the invention may comprise a known additive such as catalyst (e.g., triphenylphosphine), hardening aid (e.g., diallyl phthalate, triaryl phthalate), releasing agent (e.g., aliphatic acid amide wax, synthetic wax, latex, metal salt of aliphatic acid) and filler (e.g., talc, calcium carbonate, aluminum hydroxide) incorporated therein as necessary.

The content of the various components in the molding composition of the invention is not specifically limited so far as the resulting molded article exhibits practically sufficient strength. The term "practically sufficient strength" as used herein is meant to indicate that the normal temperature (25° C.) flexural strength determined according to JIS-K6911 is preferably 100 kg/cm$^2$ or more, more preferably 120 kg/cm$^2$ or more.

In some detail, the content of Component (A) is preferably from 29 to 99% by weight, more preferably from 50 to 98.9% by weight, from the standpoint of specific gravity and strength of molded article.

The content of Component (B) and/or Component (C) is preferably from 0.5 to 70% by weight, more preferably from 0.9 to 50% by weight from the standpoint of strength and specific gravity of molded article.

The content of Component (D) is preferably from 0.1 to 30% by weight, more preferably from 0.1 to 20% by weight from the standpoint of strength of molded article.

The content of the additive such as catalyst, hardening aid, releasing agent and filler in the molding composition is not specifically limited so far as the desired effect can be exerted.

The molding composition of the invention can be obtained by mixing the foregoing Component (B) and/or Component (C) and optionally the foregoing additives by means of a Henschel mixer, domestic mixer or over a fluidized bed, and then mixing the mixture with Component (A) by the method such as shaking up in a polyethylene bag as a simple method.

The process for molding the molding composition of the invention to obtain a molded article of the invention is not specifically limited. A known process such as compression molding, laminate molding, injection molding and extrusion may be used. The molding composition may be preheated or heated before being subjected to molding.

The molded article thus obtained has a practically sufficient strength and a good heat resistance and thus is suitable for the production of cores of automobile interior materials, sound absorbers of air conditioners, glass mat, constructional sound insulators, and the like. The heat resistance is measured by the process described in the following examples.

EXAMPLE

Resin Preparation Example 1

2,800 g (8 mols) of a propylene oxide (average added number of mols: 2.1) adduct of bisphenol A, 960 g (4 mols) of hydrogenated bisphenol A, 496 g (8 mols) of ethylene glycol, 2,366 g (20.4 mols) of fumaric acid, 16 g of dibutyltin oxide, and 0.6 g of hydroquinone were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a linear unsaturated polyester resin having an iodine value of 86.3 and a softening point of 106° C. The resin was used in Example 1.

The iodine value was measured according to JIS K 0070. For the measurement of softening point, Koka type flow tester produced by Shimadzu Corp. was used. The measurement was effected at a load of 196 N, an orifice diameter of 1 mm, an orifice length of 1 mm and a temperature rising rate of 3° C. per minute. The temperature at which half the amount of a sample flows out of the orifice was defined to be a softening point.

Resin Preparation Example 2

1300 g (4 mols) of an ethylene oxide (average added number of mols: 2.1) adduct of bisphenol A, 960 g (4 mols) of hydrogenated bisphenol A, 540 g (6 mols) of 1,4-butanediol, 1650 g (14.3 mols) of fumaric acid, and 0.4 g of hydroquinone were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a linear unsaturated polyester resin having an iodine value of 87.9 and a softening point of 110° C. The resin was used in Example 2.

Resin Preparation Example 3

650 g (2 mols) of an ethylene oxide (average added number of mols: 2.1) adduct of bisphenol A, 186 g (3 mols) of ethylene glycol, 960 g (4 mols) of hydrogenated bisphenol A, 136 g (1 mol) of methaxylenediamine, 1009 g (10.3 mols) of maleic anhydride, and 0.4 g of hydroquinone were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a linear unsaturated polyester polyamide resin having an iodine value of 86.0 and a softening point of 105° C. The resin was used in Example 3.

Resin Preparation Example 4

1260 g (14 mols) of 1,4-butanediol, 350 g (1 mol) of a propylene oxide (average added number of mols: 2.1) adduct of bisphenol A, 1816 g (15.75 mols) of fumaric acid, and 1.5 g of dibutyltin oxide were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a linear unsaturated polyester resin having an iodine value of 136 and a softening point of 122° C. The resin was used in Example 4.

Resin Preparation Example 5

2450 g (7 mols) of a propylene oxide (average added number of mols: 2.1) adduct of bisphenol A, 1200 g (5 mols) of hydrogenated bisphenol A, 496 g (8 mols) of ethylene glycol, 2366 g (20.4 mols) of fumaric acid, 8 g of dibutyltin oxide, and 0.6 g of hydroquinone were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a linear unsaturated polyester resin having an iodine value of 72.1 and a softening point of 103° C. The resin was used in Example 5.

Resin Preparation Example 6

7000 g (20 mols) of a propylene oxide (average added number of mols: 2.1) adduct of bisphenol A, 2000 g (20.4 mols) of maleic anhydride, 22 g of dibutyltin oxide, and 0.9 g of hydroquinone were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a linear unsaturated polyester resin having an iodine value of 47 and a softening point of 93° C. The resin was used in Comparative Example 1.

Resin Preparation Example 7

1350 g (15 mols) of 1,4-butanediol, 1816 g (15.75 mols) of fumaric acid, and 1.5 g of dibutyltin oxide were reacted at a temperature of 160° C. in an atmosphere of nitrogen for 4 hours. Thereafter, the reaction temperature was raised to 200° C. where the reaction mixture was then allowed to react under atmospheric pressure for 1 hour and then under a pressure of 9.33 kPa for 1 hour. The resulting resin was found to be a crystalline linear unsaturated polyester resin having an iodine value of 112 and a softening point of 125° C. (melting point: 117° C.). The resin was used in Comparative Example 2.

Examples 1–5; Comparative Examples 1–2

The resins [Component (B) or Component (C)] obtained in the foregoing Resin Preparation Examples 1 to 7 were each ground to obtain a powder having a particle diameter of from 30 $\mu$m to 200 $\mu$m. As an aggregate [Component (A)] there was used a fibrous substrate obtained in the form of pieces of threads from cut fabric. As a radical generator [Component (D)] there was used t-butylcumyl peroxide supported on silica (silica content: 60% by weight). The various components except Component (A) were mixed by Henschel mixer in the ratio set forth in Table 1, and then Component (A) in the ratio set forth in Table 1 was mixed with the mixture by shaking up in a polyethylene bag to prepare a molding composition. The molding composition thus obtained was put in between mirror-finished stainless steel plates, placed in a hot press set at 190° C., and then hot-pressed under a contact pressure of 1.47 MPa for 1 minute to obtain a plate having a thickness of 6 mm, a length of 20 cm and a width of 5 cm.

These molded plates were each then subjected to normal temperature flexural strength test and 120° C. heat resistance evaluation. The results are set forth in Table 1 below. In any case, no irritating smell was generated in the 120° C. heat resistance evaluation. The molded plates were each put in a desiccator where it was then allowed to stand for 24 hours. The air was then sucked out of the desiccator by means of a formalin gas detecting tube. As a result, no formalin was detected.

The normal temperature flexural strength test was effected according to JIS K-6911. In the 120° C. heat resistance evaluation, the molded plate was left to stand in an oven at 120° C. for 2 hours with a 20 g weight put on the center thereof. The plate was taken out of the oven, and then evaluated according to the following criterion.

Criterion of Evaluation

A . . . No warpage;
B . . . The warpage shown when the center of the plate comes in contact with flat surface is less than 1 mm;
C . . . The warpage shown when the center of the plate comes in contact with flat surface is from 1 mm to less than 2.5 mm;
D . . . The warpage shown when the center of the plate comes in contact with flat surface is 2.5 mm or more

TABLE 1

|  | Number | Composition of molding composition (parts by weight) | | | Content of alkylene oxide adduct of bisphenol A in Component B or C (mol %) | Normal temperature flexural strength (kg/cm²) | 120° C. heat resistance |
| --- | --- | --- | --- | --- | --- | --- | --- |
|  |  | Component A | Component B or C | Component D |  |  |  |
| Example | 1 | 66 | 32.8 | 2.5 | 19.8 | 160 | A |
|  | 2 | 66 | 32.8 | 2.5 | 14.1 | 145 | A |
|  | 3 | 66 | 32.8 | 2.5 | 9.9 | 150 | A |
|  | 4 | 66 | 32.8 | 2.5 | 3.3 | 140 | A |
|  | 5 | 66 | 32.8 | 2.5 | 17.3 | 160 | A |
| Comparative | 1 | 66 | 32.8 | 2.5 | 49.5 | 110 | C |
| Example | 2 | 66 | 32.8 | 2.5 | 0 | 120 | B |

As can be seen in the results of Table 1, all the molded plates obtained in Examples 1 to 5 have a practically sufficient strength and heat resistance as compared with those obtained in Comparative Examples 1 and 2.

What is claimed is:

1. A molding composition consisting essentially of:
   (A) an aggregate; at least one of
   (B) a linear unsaturated polyester and
   (C) a linear unsaturated polyester polyamide; and
   (D) a radical generator,
   wherein each of Component (B) and (C) has a content of an alkylene (having from 2 to 4 carbon atoms) oxide adduct of bisphenol A (average added number of mole: 1 to 10) of 3 to 40 mol % based on an amount of constituent monomers of each of said Components (B) and (C)
   and wherein component (B) has a softening point of 80° C. to 130° C.;
   and wherein component (C) has a softening point of 80° C. to 130° C.

2. The molding composition according to claim 1, wherein said Component (A) is a fibrous material.

3. The molding composition according to claim 1, wherein each of said Component (B) and (C) has an iodine value of 70 to 150.

4. The molding composition according to claim 1, wherein the contents of said Component (A), the sum of said Components (B) and (C), and said Component (D) are from 29 to 99% by weight, from 0.5 to 70% by weight, and from 0.1 to 30% by weight, respectively, based on the total amount of the composition.

5. The molding composition according to claim 1, wherein each of said Components (B) and (C) has at least one addition-polymerizable unsaturated group in an amount of 35 to 70% by weight based on an amount of constituent monomers of each of said Components (B) and (C).

6. A molded article obtained by molding the molding composition according to claim 1.

7. The molding composition according to claim 1, which is for production of cores of automobile interior materials, sound absorbers of air conditioners, glass mat, and constructional insulators.

8. The composition of claim 1, wherein the polyester resin has a softening point of 93° C. or above.

* * * * *